(12) United States Patent
Srivastava

(10) Patent No.: US 10,320,430 B2
(45) Date of Patent: Jun. 11, 2019

(54) TRANSMITTER WITH POWER SUPPLY REJECTION

(71) Applicant: Intel Corporation, Santa Clara, CA (US)

(72) Inventor: Amit Kumar Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,535

(22) Filed: Sep. 29, 2017

(65) Prior Publication Data

US 2019/0103889 A1 Apr. 4, 2019

(51) Int. Cl.
| | |
|---|---|
| *G06F 1/30* | (2006.01) |
| *H04B 1/04* | (2006.01) |
| *G06F 13/40* | (2006.01) |
| *H04B 1/16* | (2006.01) |

(52) U.S. Cl.
CPC .............. *H04B 1/04* (2013.01); *G06F 1/305* (2013.01); *G06F 13/4072* (2013.01); *H04B 1/1607* (2013.01)

(58) Field of Classification Search
CPC ....... G06F 1/305; G06F 13/4072; H04B 1/04; H04B 1/0466; H04B 1/0475; H04B 1/1607
USPC ........ 326/82, 83, 86, 87; 327/108, 109, 111, 327/112, 306, 309, 315, 317, 318, 319
See application file for complete search history.

(56) References Cited

U.S. PATENT DOCUMENTS

| | | | | |
|---|---|---|---|---|
| 4,592,087 A | * | 5/1986 | Killion | H03F 3/2171 330/251 |
| 5,276,356 A | * | 1/1994 | Shirotori | H03K 3/011 326/21 |
| 5,446,697 A | * | 8/1995 | Yoo | G11C 5/145 365/189.07 |
| 2008/0111590 A1 | | 5/2008 | Terryn | |
| 2010/0052728 A1 | | 3/2010 | Lu et al. | |
| 2014/0062590 A1 | | 3/2014 | Khlat et al. | |
| 2014/0253227 A1 | | 9/2014 | Yach et al. | |
| 2015/0171790 A1 | | 6/2015 | Davies et al. | |
| 2016/0142819 A1 | * | 5/2016 | Yasuda | H04R 29/003 381/55 |

OTHER PUBLICATIONS

International Search Report and Written Opinion from PCT/US2018/048633 dated Dec. 14, 2018, 15 pgs.

* cited by examiner

*Primary Examiner* — William Hernandez
(74) *Attorney, Agent, or Firm* — Green, Howard & Mughal LLP

(57) ABSTRACT

Described is an apparatus which comprises: a driver comprising a push-pull transmitter; a first circuitry to sense variation in a power supply; and a second circuitry coupled to the first circuitry and to the driver, the second circuitry to generate a code according to an output of the first circuitry, wherein the code is provided to the driver to adjust a performance parameter of the driver.

22 Claims, 9 Drawing Sheets

TRANSMITTER WITH POWER SUPPLY REJECTION

BACKGROUND

Current-mode transmitters are generally less sensitive to power supply and process variation. However, current-mode transmitters consume higher power consumption than voltage-mode transmitters. Voltage-mode transmitters are attractive for their simplicity and lower power consumption when compared with current-mode transmitters. However, typical voltage-mode transmitters suffer from power supply variation which directly impacts the output voltage swing of the transmitter and the timing margin. These challenges are exacerbated when voltage-mode transmitters are used for high speed operation (e.g., for high speed Universal Serial Bus 2 (USB2) compliant transmitter but not limiting to other protocol like USB3, Peripheral Component Interconnect Express (PCIe), and MIPI® PHY).

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
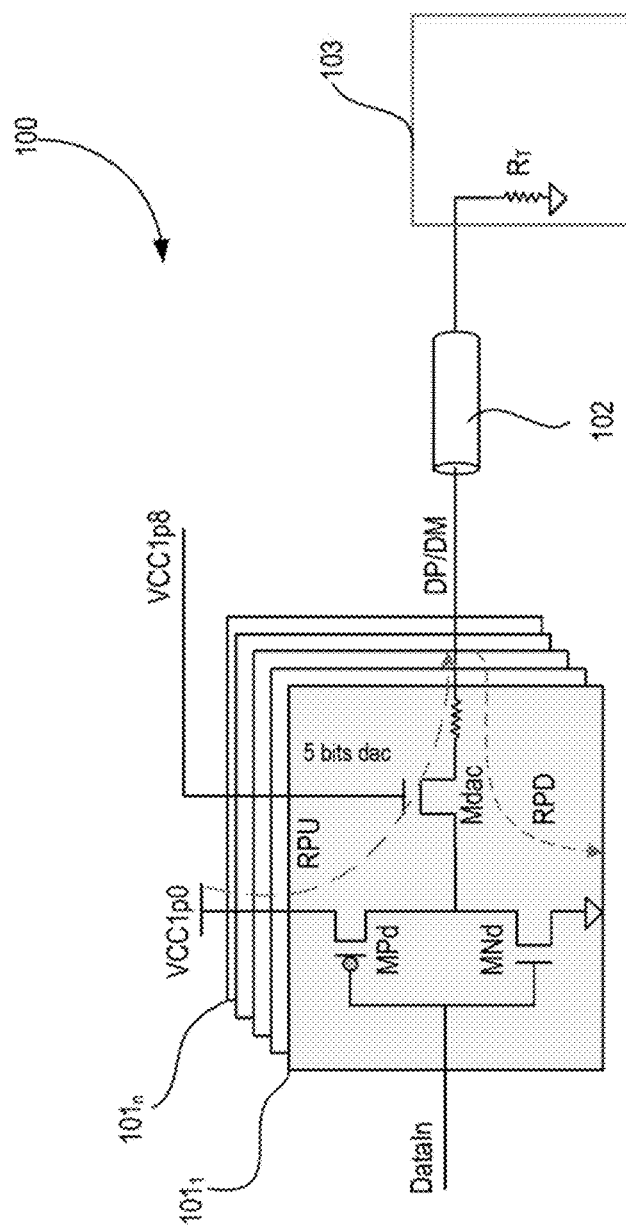
FIG. 1 illustrates a system showing a push-pull driver and receiver.

Some embodiments describe an apparatus that calibrates a driver (e.g., a transmitter) according to power supply noise or variation. In some embodiments, a sense circuitry is used to sense power supply noise or variation. For example, a filtered power supply is used to power a ring oscillator, the frequency of which represents the sensed power supply noise. As noise on the sensed power supply varies, the frequency of an output clock from the ring oscillator also varies. In some embodiments, the clock from the oscillator is compared with a reference clean clock, and a determination is made about whether the clock is faster or slower than the reference clock. In some embodiments, based on the determination, a digital code is generated which is used to adjust a performance parameter of the driver output. One example of a performance parameter is voltage swing at the output of the driver. In some embodiments, a lookup table (LUT) is used to provide a target reference code across process variation. LUT is useful in deciding whether the process band design is on typical, fast or slow.

There are many technical effects of various embodiments. For example, power consumption of the driver architecture is reduced because pre-emphasis circuitry can be eliminated. In one example, nearly 2 mW (milliWatt) to 4 mW of power can be reduced per driver resulting in about 50% savings in driver power. The apparatus of various embodiments is mostly a digital solution, which is less sensitive towards supply variation and easily scalable to newer process technology nodes. In some embodiments, the voltage swing of the driver output is adjusted by adjusting a reference current to a desired value without impacting transmitter output termination impedance. The apparatus of various embodiments is a generic design that can be used for other high speed transmitters and other power supply sensitive circuits. For example, the digital code generated by a calibration circuitry can be used to adjust parameters other than voltage swing. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices.

The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The term "scaling" may also refer to adjusting the magnitude of the power supply voltage (e.g., voltage scaling) to the circuit(s).

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

It is to be understood that the terms so used are interchangeable under appropriate circumstances such that the embodiments of the invention described herein are, for example, capable of operation in other orientations than those illustrated or otherwise described herein.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks may be Tunneling FETs (TFETs) or some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used for some transistors without departing from the scope of the disclosure.

FIG. 1 illustrates system 100 showing a push-pull driver and receiver. System 100 comprises a plurality of push-pull drivers $101_{1-n}$, where 'n' is an integer. Push-pull drivers (e.g., $101_1$) consist of a p-type pull-up device MPd coupled in series with an n-type pull-down device MNd. Input data DataIn (or DIN) is received at the gates of the p-type pull-up device MPd and n-type pull-down device MNd. The push-pull drivers operate on a first power supply (e.g., VCC1p0 indicating a 1.0 V power supply). The output of the push-pull driver is coupled to a pass-transistor Mdac in series with a resistor R. Mdac may operate on a higher power supply (e.g., VCC1p8 indicating a 1.8 V power supply) to control how many devices of Mdac need to be turned on. One push-pull driver may generate a first output DP and another push-pull driver may generate another output DP, and as such a differential output can be achieved. These outputs are received by a receiver 103 (modeled here as a pull-down termination $R_T$) via transmission lines 102.

The use of a voltage-mode transmitter (e.g., Push-pull driver $101_1$) comes at the cost of wider power supply variation. Power supply variation directly impacts the voltage swing Vsw of signal on the connector (e.g., output of Push-pull driver $101_1$ connecting the transmission line 102). Voltage swing can be expressed as:

$$V_{SW}=VDD*R_T/(R_T+R_{PU}) \quad (1)$$

where VDD is the power supply (e.g., VCC1p0), $R_T$ is the receiver termination, and $R_{PU}$ is the pull-up impedance.

Generally, the pull-up impedance $R_{PU}$ and pull-down impedance $R_{PD}$ are calibrated by an impedance compensation (RCOMP) circuitry (not shown). However, the reference voltages used for such calibration are also derived from the very power supply that suffers from supply variation. Using bandgap references for such calibration would increase the power and area cost of the overall driver architecture.

Figure 2:
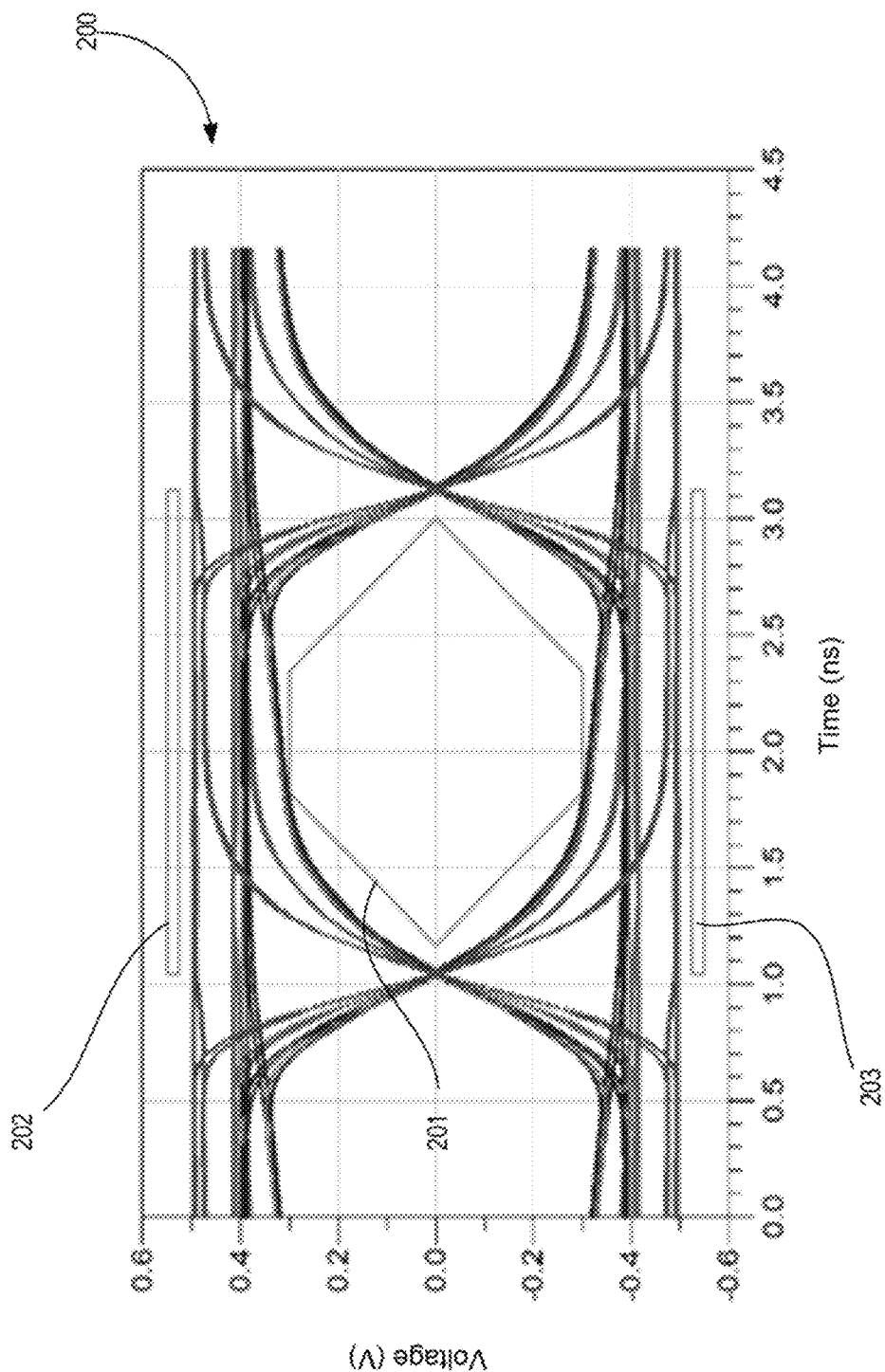
FIG. 2 illustrates a plot showing an eye diagram at the connector of the system.

FIG. 2 illustrates plot 200 showing an eye diagram at the connector of the system. Here, the x-axis is time (ns) and the y-axis is voltage (V). The eye is shown by indicator 201, while levels 202 and 203 illustrate the high and low limits of the voltage swing. Plot 200 shows an eye diagram formed across multiple process corner nodes. Due to power supply variation, the voltage swing varies and may use up more of the area of eye 201, which may result in timing and other specification failures. The small eye opening of eye 201 means that additional circuitry along the pull-up and pull-down impedance paths may further reduce head-room which in turn will reduce eye height and width. One way to improve eye height and width is to use pre-emphasis circuitry. However, pre-emphasis circuitry adds power (e.g., 4 to 8 mW) to the driver architecture.

Figure 3:
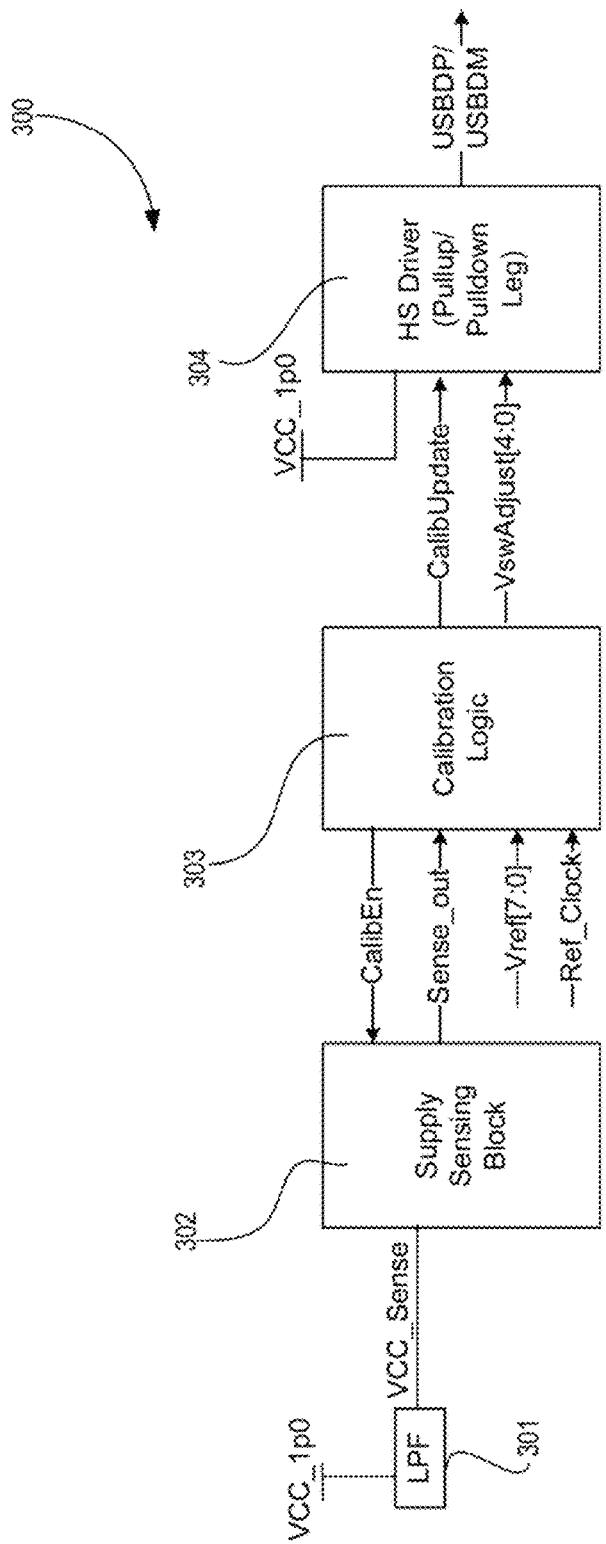
FIG. 3 illustrates an apparatus for adjusting voltage swing of a push-pull driver according to noise on a power supply, according to some embodiments of the disclosure.

FIG. 3 illustrates apparatus 300 for adjusting voltage swing of a push-pull driver according to noise (DC or AC) on a power supply, according to some embodiments of the disclosure. In some embodiments, apparatus 300 comprises low pass filter (LPF) 301, supply sensing block or circuitry 302, calibration logic or circuitry 303, and high-speed driver (pull-up/pull-down leg) 304.

In some embodiments, LPF 301 is coupled to a first power supply (e.g., VCC_1p0 which refers to a 1.0 V power supply) and is used to detect DC (direct current) variation in the first power supply. The output of LPF 301 is VCC_Sense, which is a filtered version of the first power supply. In this example, the cut-off frequency of the LPF is less than 10 MHz, and can be fixed or programmed. In some embodiments, LPF 301 is removed so as to sense AC (alternating current) variation in the first power supply. In one such embodiment, the first power supply is directly coupled to the Supply Sensing Block 302.

Figure 4:
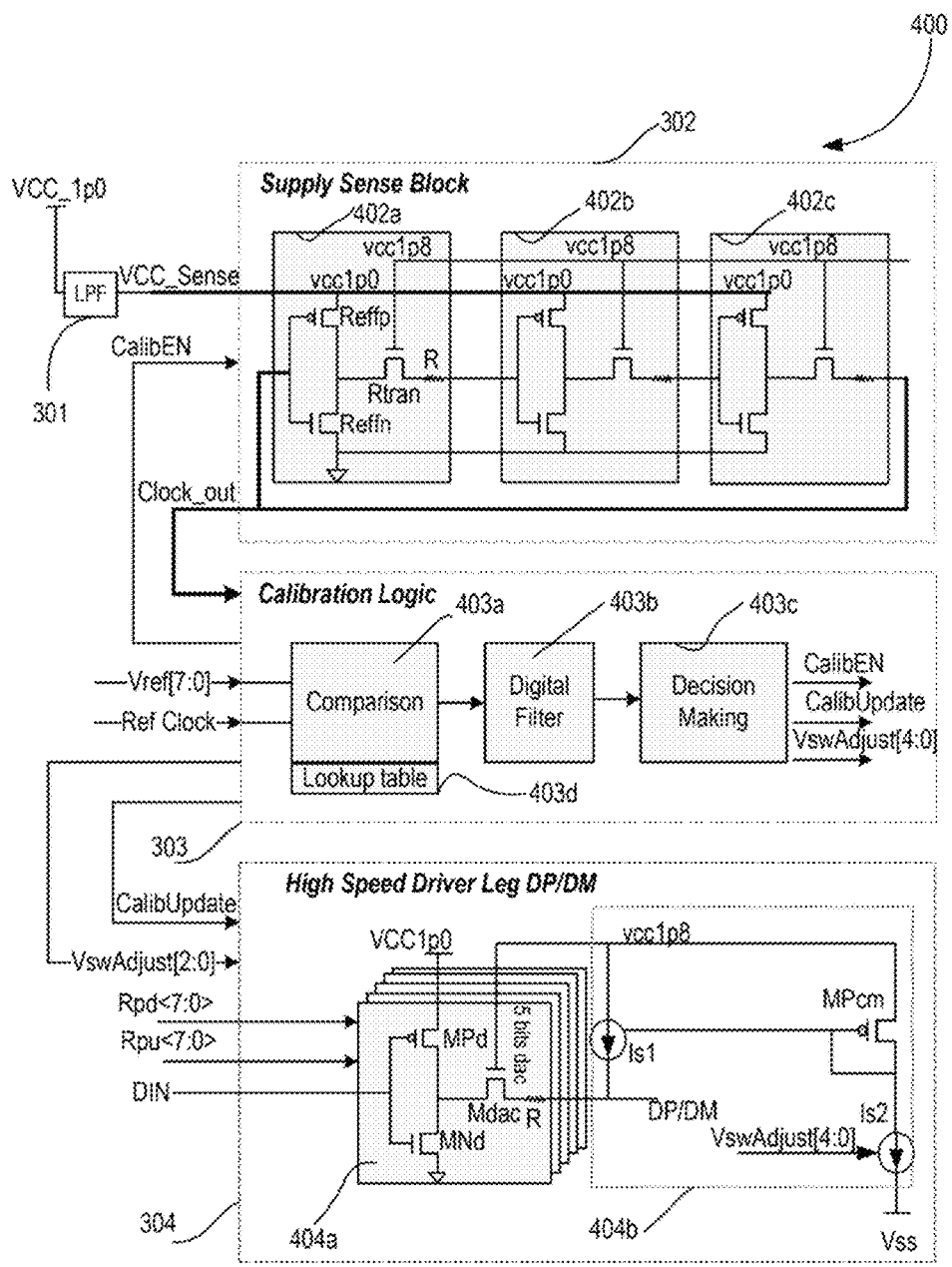
FIG. 4 illustrates a schematic view of the apparatus of FIG. 3, according to some embodiments of the disclosure.

In some embodiments, Supply Sensing block 302 senses the filtered (or in one case, unfiltered) VCC_Sense and converts the voltage of that supply into a digital domain. For example, a clock (Sense_out) is generated whose frequency change represents change in VCC_Sense. As such, noise or variation on VCC_Sense is captured as change in clock frequency. In some embodiments, Supply Sensing block 302 comprises a ring oscillator which includes delay stages that substantially mimic the push-pull driver architecture of driver 304. For example, most of the driver architecture minus the current mirror circuitry, discussed later with reference to FIG. 4, is used as a delay stage of the ring oscillator. Referring back to FIG. 3, the output of the Supply Sensing block 302 is Sense_out which is compared with a reference clock (Ref_Clock) in Calibration Logic 303. In some embodiments, Ref_Clock is a clean clock that can be provided by a crystal oscillator.

In some embodiments, Calibration Logic 303 is to adjust a reference digital code according to a LUT and a compensation code. In some embodiments, the compensation code is an impedance compensation code which is used to adjust impedance (pull-up and/or pull-down) of driver 304. The impedance compensation code may be generated by an impedance compensation circuitry (also referred to as RCOMP) that adjusts an impedance of a replica driver against a reference or target impedance, and once this impedance of the replica driver is adjusted for process, temperature, and voltage (PVT) variations, it is provided as an impedance compensation code to driver 304 and also stored in a LUT.

In some embodiments, Calibration Logic 303 generates a time domain ratio, $N_{Sensor}$, of the frequency of Sense_out ($F_{Sense}$) and Ref_Clock ($F_{reference}$). This time domain ratio $N_{Sensor}$ represents the variation of supply VCC_Sense against a reference.

$$F_{Sense}(V) = 1/6*(0.69*(Reff*Cg)$$

where Reff is the effective pull-up or pull-down impedance of the replica driver used in a ring oscillator topology in Supply Sense Block 302, and can be expressed $R_{CPR} + R_{Tran} + R_{transmitter}$, and where Cg is an input capacitance of the replica driver. As is described later, $R_{CPR}$ is the pull-up or pull-down resistance of the push-pull replica driver, $R_{Tran}$ is the resistance of the pass-gate coupled to the output of the pull-up and pull-down devices of the driver, and $R_{transmitter}$ is the resistance of a resistor coupled in series with the pass-gate.

In some embodiments, Calibration Logic 303 generates a digital code $N_{REF}$ which is compared with $N_{SENOR}$. In some embodiments, based on the comparison, Calibration Logic 303 determines whether calibration of the driver is needed. For example, when $N_{SENSOR}$ is above $N_{REF}$ by a particular amount (e.g., predetermined or programmable), Calibration Logic 303 determines that Calibration is needed, and CalibEN is enabled. In some embodiments, this particular amount is according to a frequency band, and is stored in a LUT.

For example, for different frequency bands, different threshold levels for the particular amount are used. In some embodiments, when calibration is needed, Calibration Logic 303 generates a CalibUpdate signal and a digital code VswAdjust (e.g., 5 bits, [4:0]) to adjust a reference current of a current source of driver 304. In some embodiments, by adjusting the current strength of the current source, an output voltage swing of the signal generated by driver 304 is adjusted to a desired or target level. In some embodiments, the adjustment of the reference current does not change the termination impedance of driver 304. In some embodiments, a finite state machine (FSM) is used to control the operation of Calibration Logic 303. In some embodiments, the FSM operates after an FSM of the RCOMP circuitry generates an impedance compensation code.

In some embodiments, driver 304 is an enhanced version of driver 101. In some embodiments, driver 304 includes a push-pull circuitry with transistors MPd and MNd, and Mdac. In some embodiments, a current mirror network is added to the output of driver 304 to increase or decrease the signal strength driven by driver 304 without impacting its termination impedance. In some embodiments, strength of a reference current source of the current mirror is adjusted by the digital code VswAdjust from Calibration Logic 303, and is applied to the current source when CalibUpdate is enabled or asserted. In some embodiments, the current mirror network operates on a higher power supply than the push-pull circuitry of driver 304. For example, the current mirror network operates at 1.8 V power supply. In some embodiments, the current mirror network works at lower supply, for example, 1.0 V power supply.

FIG. 4 illustrates a schematic view 400 of the apparatus of FIG. 3, according to some embodiments of the disclosure. It is pointed out that those elements of FIG. 4 having the same reference numbers (or names) as the elements of any other figure can operate or function in any manner similar to that described, but are not limited to such.

In some embodiments, Supply Sense Block 302 comprises delay stages (e.g., 402*a*, 402*b*, 402*c*) configured to form a ring oscillator. In some embodiments, each delay stage is a replica of driver 404*a*. For example, delay stage 402*a* comprises a pull-up transistor having impedance Reffp, pull-down transistor having impedance Reffn, transmission gate transistor having impedance Rtran, and series termination resistor (or package resistor) R coupled together as shown. In some embodiments, VCC_Sense is coupled to Vcc1p0 node of the delay stages 402*a-c*. In some embodiments, Vcc1p8 node is coupled to a fixed supply level of 1.8V. Here, node names and signal names are interchangeably used. For example, Vcc1p8 may refer to node Vcc1p8 or power supply Vcc1p8 on that node. The output clock Clock_out has a frequency which is a function of supply and process. The architecture of the delay stage is such that it has low sensitivity towards temperature.

In some embodiments, the ring oscillator of Supply Sense Block 302 is gated by CalibEn signal. For example, when calibration is enabled (e.g., when CalibEn is high), Supply Sense Block 302 is activated which allows for sensing of VCC_Sense in the form of oscillating clock Clock_out. Likewise, when calibration is disabled (e.g., when CalibEn is low), then Supply Block 302 is deactivated and Clock_out no longer oscillates.

While the embodiments illustrate a ring oscillator with three delay stages 402*a*, 402*b*, and 402*c*, other number of stages may be used. For example, three or five delay stages may be used and coupled together in a ring formation.

In some embodiments, Calibration logic 303 comprises comparator 403*a*, filter 403*b*, decision making logic 403*c*, and LUT 403*d*. In some embodiments, comparator 403*a* comprises a first input that receives Clock_out and a second input that receives Ref_Clock. In some embodiments, comparator 403*a* is a clocked comparator. In some embodiments, the output of Comparator 403*a* is filtered by filter 403*b*. In some embodiments, the output of Comparator 403*a* is a ratio of Clock_out relative to Ref_Clock. By comparing Clock_out with an ideal or near ideal Ref_Clock, change in supply VCC_1p0 is determined. In some embodiments, filter 403*a* is a digital filter. For example, filter 403*a* is a chain of shift registers. In some embodiments, filter 403*a* is an analog filter.

In some embodiments, the output of filter 403*b* is processed by Decision Making logic 403*c*. The outputs of Decision Making logic 403*c* include Calibration Enable signal (CalibEN), calibration update signal (CalibUpdate), and voltage swing adjustment code (VswAdjust). In some embodiments, Decision Making logic 403*c* is implemented as a finite state machine (FSM). In some embodiments, the FSM works in combination with an impedance control state machine as described with reference to FIG. 5.

Referring back to FIG. 4, in come embodiments, driver 304 comprises a plurality of push-pull circuitries. So as not to obscure the embodiments, architecture of one push-pull circuitry 404*a* is described. In some embodiments, push-pull circuitry 404*a* is like 101$_1$. In some embodiments, push-pull circuitry 404*a* includes pull-up p-type transistor MPd, pull-down n-type transistor MNd, programmable transmission device Mdac (e.g., n-type device controlled by 5 bit digital to analog control bits), package or driver series impedance R (e.g., 45 Ohms), and current mirror circuitry 404b. In some embodiments, each push-pull circuitry has a corresponding current mirror circuitry 404b. In some embodiments, multiple push-pull circuitries share the same current mirror circuitry 404b. For example, 'n' number of push-pull circuitries that are adjacent to one another can share the same current mirror circuitry 404b.

In some embodiments, current mirror circuitry 404b comprises a first reference current source Is1, a second reference current source Is2, and a current mirror device MPcm coupled together as shown. In some embodiments, the first reference current source Is1 mirrors the current Is2 by a factor (e.g., a factor of 1 or more). For example, the first reference current source Is1 is a p-type transistor with its gate terminal coupled to the gate terminal of transistor MPcm, source terminal coupled to Vcc1p8, and drain terminal coupled to the output node DP/DM. The embodiments are not limited to this particular current mirror circuitry, and other such circuitries that can have variable current strength using a digital code can also be used.

In some embodiments, based on the comparison of clocks by Calibration Logic, Is2 is adjusted to adjust output swing on nodes DP/DM. As such, transmitter impedance change is not changed. The adjustment to the voltage swing on DP/DM can be expressed as:

$$Vsw(DP/DM)=Vcc1p0*R_T/(R_T+R_{PU})+Is2[4:0]*(R_T\|(R_{PU}(\text{or } R_{PD})));$$

where Is2 is current which is adjusted digitally by VswAdjust (having five bits in this example), where $R_T$ is the termination impedance of the receiver, $R_{PU}$ is the pull-up impedance of the driver 404a, and $R_{PD}$ is the pull-down impedance of driver 404a.

In some embodiments, Calibration Logic 303 compares Clock_out with Ref Clock to generate a reference code based on a predetermined or stored target reference count in LUT 403d. For example, LUT 403d may have different count values for different frequency bands. Depending on the frequency of Clock_out within a Ref_Clock period, a particular count value is assigned. This count value is then used to generate the code which is filtered by filter 403b, in accordance with some embodiments. Decision making logic 403c then uses the output of filter 403b to generate Vsw-Adjust code for adjusting the reference current Is2 of driver 304. By digitally adjusting reference current Is2, the voltage swing of signal on node DP/DM is adjusted.

While various embodiments illustrate using push-pull transmitter architecture, the embodiments are not limited to such. For example, the scheme of various embodiments is also applicable to cases where both push-up and pull-down devices are n-type only or p-type only. In those cases, the replica branches are to have similar architecture.

Figure 5:
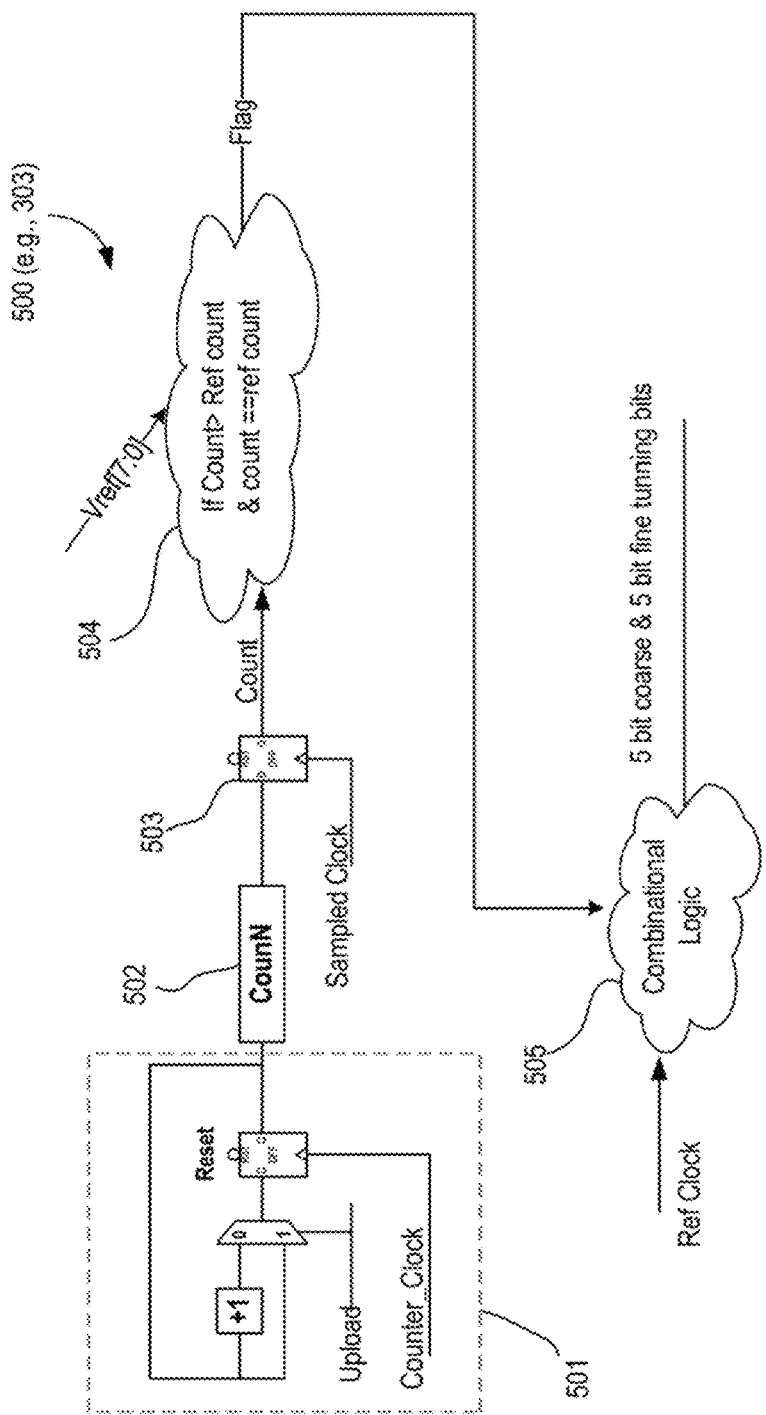
FIG. 5 illustrates a calibration logic of the apparatus of FIG. 3, according to some embodiments of the disclosure.

FIG. 5 illustrates calibration logic 500 (e.g., 303) of the apparatus of FIG. 3, according to some embodiments of the disclosure. It is pointed out that those elements of FIG. 5 having the same reference numbers (or names) as the elements of any other figure can operate or function in any manner similar to that described, but are not limited to such.

FIG. 5 illustrates a functional schematic of calibration logic 500 which includes counter 501, register 502 that saves the count value, sequential 503, logic 504 to compare the count value with a reference count, and combinational logic 505. In some embodiments, counter 501 counts the number of pulses in Clock_out within a Ref_Clock and stores that in register 502.

Here, the signal Upload is used for latching the final counter value during lock time to compare. For example, when Upload is asserted, the final counter value is latched. Sampled clock is the sampling clock which is used to sample the counter value. This is a low frequency clock and is used to latch the final value after a sampling window. This sampled value is used for comparison purposes. In some embodiments, the output of register 502 is sampled and the Count is compared with a reference count (Ref count). In some embodiments, the Ref (reference) count is a fixed code provided by Vref (e.g., 8 bit count code). In this example, Vref is fixed digital code which acts as a reference voltage in the digital domain. As such, Vref is less susceptible to noise as compared to a traditional analog signal. This reference code is a fixed and programmable code based on what value is needed to be programmed. A person skilled in the art would appreciate that an analog signal is any continuous signal for which the time varying feature (variable) of the signal is a representation of some other time varying quantity, i.e., analogous to another time varying signal, while a digital signal is a physical signal that is a representation of a sequence of discrete values (a quantified discrete-time signal), for example of an arbitrary bit stream, or of a digitized (sampled and analog-to-digital converted) analog signal.

Figure 6:
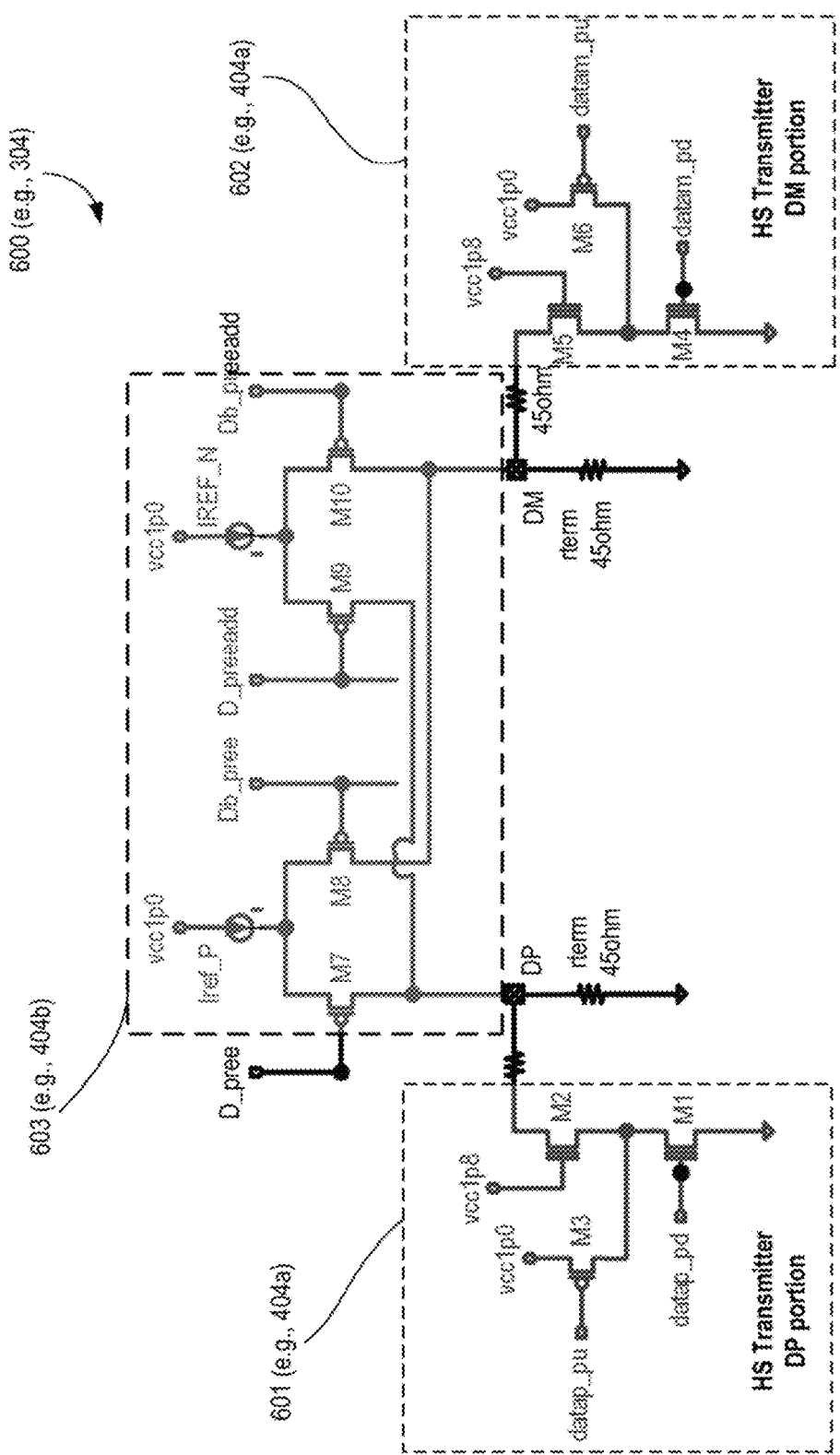
FIG. 6 illustrates a schematic view of the push-pull driver with adjustable voltage swing, according to some embodiments of the disclosure.

FIG. 6 illustrates schematic view 600 (e.g., 304) of the push-pull driver with adjustable voltage swing, according to some embodiments of the disclosure. It is pointed out that those elements of FIG. 6 having the same reference numbers (or names) as the elements of any other figure can operate or function in any manner similar to that described, but are not limited to such.

Here, the differential version of driver 304 is illustrated, where driver comprises a DP portion 601 for driving a first signal on pad DP, and a DM portion 602 for driving a second signal on pad DM, where DM and DP together form a differential signal. With reference to FIG. 4, here in the case of driver 601, transistor M1 is the same as transistor MNd, transistor M2 is the same as transistor Mdac, and transistor M3 is the same as transistor MPd. Here, input signal DIN is shown as two separate components, datap_pu (for pull-up transistor M3) and datap_pd (for pull-down transistor M1). With reference to FIG. 4, here in the case of driver 602, transistor M4 is the same as transistor MNd, transistor M5 is the same as transistor Mdac, and transistor M6 is the same as transistor MPd. Here, input signal DIN is shown as two separate components, datam_pu (for pull-up transistor M6) and datam_pd (for pull-down transistor M4).

In some embodiments, current mirror circuitry 404b comprises a pair of differential current drivers as shown by circuitry 603. In some embodiments, to provide additional pre-emphasis or pre-deemphasis, transistors M9 and M10 are provided with their separate current source IREF_N. In some embodiments, current source Iref_N has adjustable current strength which is controlled by VswAdjust. In some embodiments, transistor M9 is controlled by D_preeadd, and transistor M10 is controlled by Db_preeadd (e.g., inverse of D_preeadd). Here, D_preeadd and D_pree are signals generated by a logic to enable the current source just before the data transition. In some embodiments, D_preeadd is timed or synchronized with datap_pu which is the actual transmit data. In some embodiments, the additional pre-emphasis or pre-deemphasis is not used and is disabled or removed. For example, current source IREF_N, transistor M9, and M10 are removed.

In some embodiments, current source Iref_P has adjustable current strength which is controlled by VswAdjust. In some embodiments, transistor M7 is controlled by D_pree, and transistor M8 is controlled by Db_pree (e.g., an inverse of D_pree).

In one example, if the output swing at nodes DP or DM is off by 50 mV from a target voltage swing, then the output swing can be adjusted as follows:

When driving a differential one;

$$V_{DP}=(Vcc1p0+50\ mV)*(R_T/R_T+R_{PU});$$

$$V_{DM}=Iref\_P*R_T\|R_{PD};$$

$$Vsw=V_{DP}-V_{DM};$$

Where, $V_{DP}$ is the voltage on node DP, $V_{DM}$ is the voltage on node DM, RT is the receiver termination impedance, RPU is the pull-up impedance of driver 601. In this example, the 50 mV offset in the output swing due to variation in Vcc1p0 is compensated by adjusting current strength of Iref_P by VswAdjust (e.g., a 5 bit code that turns on/off transistors in the current source generating Iref_P) on the DM node.

Similarly when driving a differential 0;

$$V_{DP}=Iref\_P*R_T\|R_{PD};$$

$$V_{DM}=(Vcc1p0+50\ mV)*(R_T/R_T+R_{PU});$$

$$Vsw=V_{DM}-V_{DP};$$

In this example, the 50 mV offset in the output swing due to variation in Vcc1p0 is compensated by adjusting current strength of Iref_P by VswAdjust (e.g., a 5 bit code that turns on/off transistors in the current source generating Iref_P) on the DP node.

Figure 7:
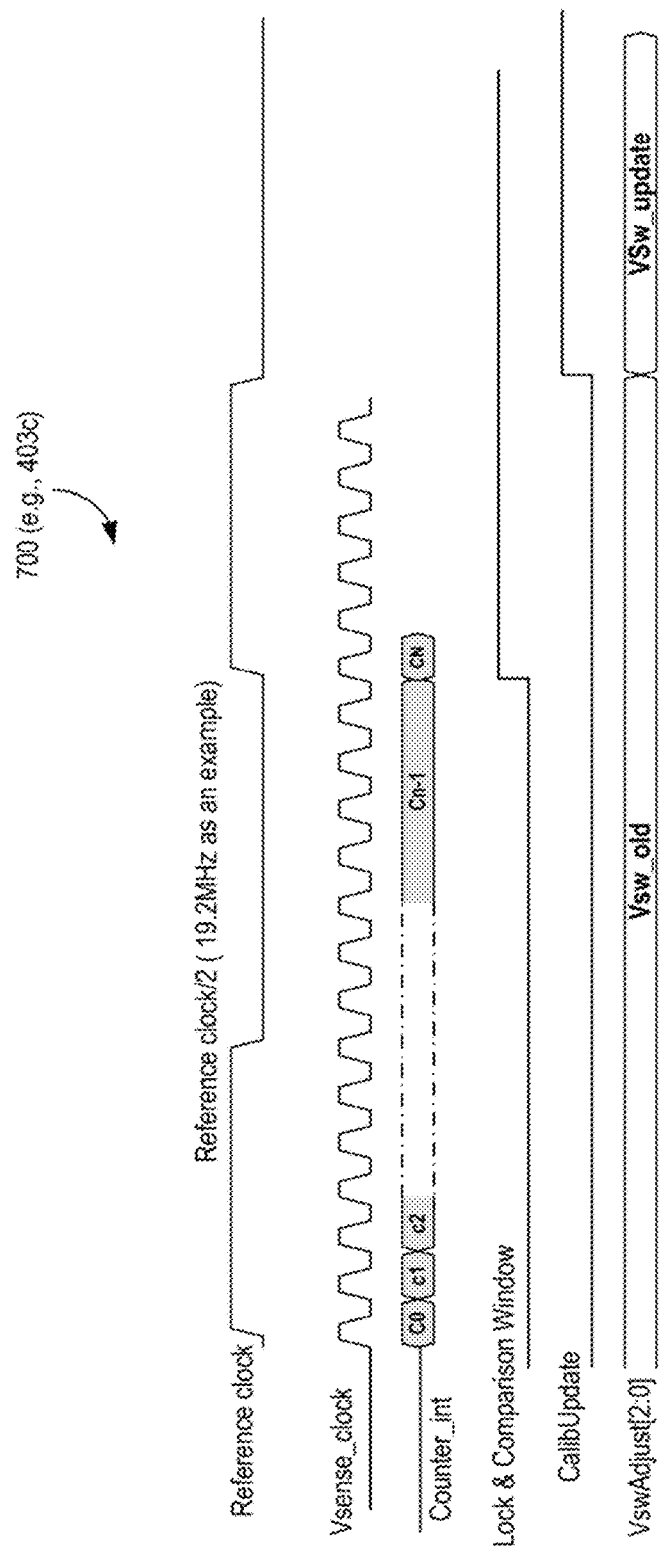
FIG. 7 illustrates a timing diagram of the calibration logic of the apparatus of FIG. 3, according to some embodiments of the disclosure.

FIG. 7 illustrates timing diagram 700 (e.g., 403c) of the calibration logic of the apparatus of FIG. 3, according to some embodiments of the disclosure. It is pointed out that those elements of FIG. 7 having the same reference numbers (or names) as the elements of any other figure can operate or function in any manner similar to that described, but are not limited to such.

In some embodiments, counter (e.g., counter 501) counts the number of Clock_out (same as Vsense_clock) pulses for one clock cycle of Ref_Clock, after which Lock & Comparison Window signal is asserted. When Lock & Comparison Window signal is asserted, the count value is compared with a reference count (e.g., Vref[5:0]) and a determination is made to update the calibration code (e.g., VswAdjust). On the following falling edge of Ref_Clock, a new VswAdjust code is provided which overwrites the old VswAdjust code.

Figure 8:
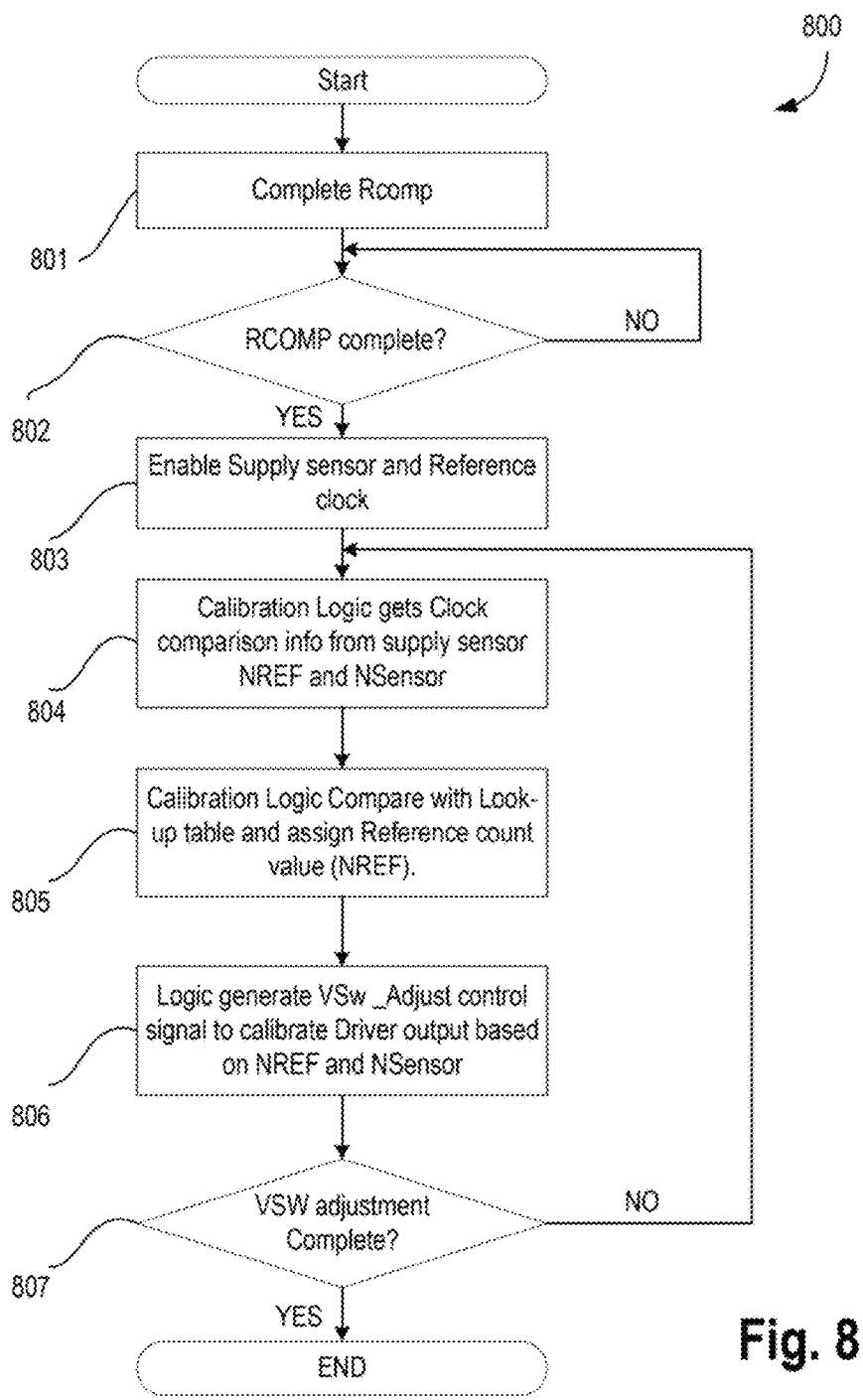
FIG. 8 illustrates a flowchart of a method of calibrating the push-pull driver, according to some embodiments of the disclosure.

FIG. 8 illustrates flowchart 800 of a method of calibrating the push-pull driver, according to some embodiments of the disclosure. It is pointed out that those elements of FIG. 8 having the same reference numbers (or names) as the elements of any other figure can operate or function in any manner similar to that described, but are not limited to such.

Although the blocks in the flowchart with reference to FIG. 8 are shown in a particular order, the order of the actions can be modified. Thus, the illustrated embodiments can be performed in a different order, and some actions/blocks may be performed in parallel. Some of the blocks and/or operations listed in FIG. 8 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block or operation 801, Rcomp process begins and is allowed to complete. At block 802, a determination is made whether the Rcomp process is complete, and if it is complete, the process proceeds to block 803. At block 803, CalibEn is asserted, which enables sensing of supply Vcc1p0 by Supply Sense Block 302. Blocks 804 through 807 are preformed by Calibration Logic 303, in accordance with some embodiments. At block 804, Calibration logic 303 compares Clock_out with Reference clock. Here, NSensor indicates counter value of Vcc sense supply block 303. At block 805, Calibration logic compares the number (e.g., count value) of Clock_out pulses with a mapping in LUT 403d, and assigns a reference count number (NREF). The NREF is then compared with the count value and VswAdjust code is determined. At block 807, a determination is made whether Vsw adjustment is complete. It is considered complete when the Vswadjust code is applied to the current source, for example. If not complete, the process proceeds to block 804.

Figure 9:
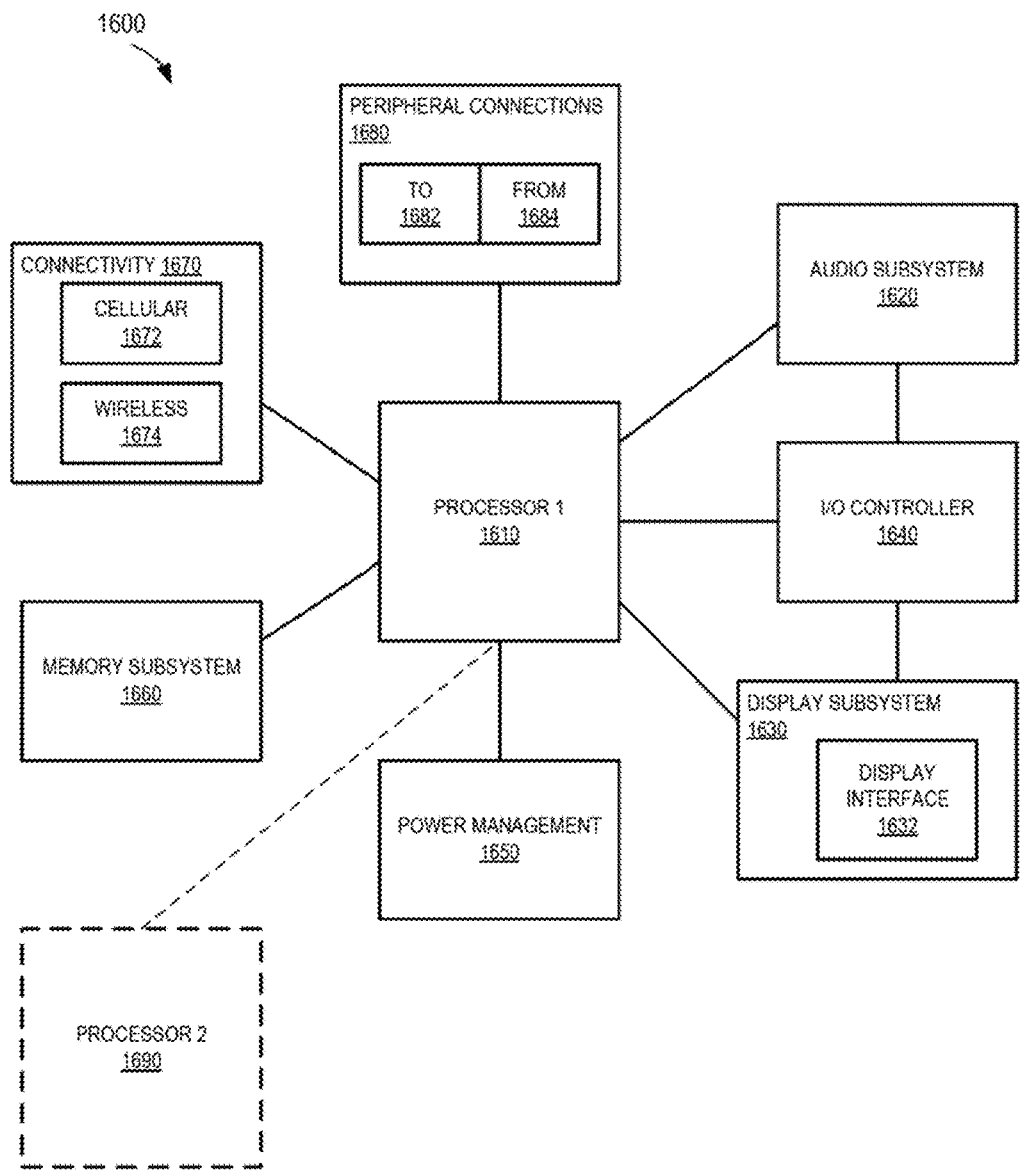
FIG. 9 illustrates a smart device or a computer system or a System-on-Chip (SoC) with the push-pull driver having adjustable voltage swing, according to some embodiments.

FIG. 9 illustrates a smart device or a computer system or a System-on-Chip (SoC) with the push-pull driver having adjustable voltage swing, according to some embodiments. It is pointed out that those elements of FIG. 9 having the same reference numbers (or names) as the elements of any other figure can operate or function in any manner similar to that described, but are not limited to such.

FIG. 9 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with one or more configurable interconnects, according to some embodiments discussed. Other blocks of the computing device 1600 may also include one or more configurable interconnects, according to some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. In some embodiments, audio subsystem 1620 includes apparatus and/or machine executable instructions to avoid self-hearing, according to some embodiments. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: a driver comprising a push-pull transmitter; a first circuitry to sense variation in a power supply; and a second circuitry coupled to the first circuitry and to the driver, wherein the second circuitry is to generate a code according to an output of the first circuitry, wherein the code is provided to the driver to adjust a performance parameter of the driver.

Example 2

The apparatus of example 1, wherein the first circuitry comprises a ring oscillator including a delay stage, wherein the delay stage comprises devices of same size as those in the driver, and wherein the devices are connected to one another in a manner same as those in the driver.

Example 3

The apparatus of example 2 comprises a low pass filter coupled to the power supply, wherein an output of the low pass filter is a filtered power supply which is to be provided to the ring oscillator as its power supply.

Example 4

The apparatus according to any of the preceding examples, wherein the output of the first circuitry is a first clock, and wherein the second circuitry comprises a digital comparator to compare the first clock with a second clock.

Example 5

The apparatus of example 4, wherein the second clock is generated by a crystal oscillator or an on-die clock.

Example 6

The apparatus of example 4, wherein the second circuitry comprises a filter coupled to an output of the comparator.

Example 7

The apparatus of example 6, wherein the filter comprises a shift-register chain.

Example 8

The apparatus of example 6, wherein the second circuitry comprises a finite state machine to generate the code according to an output of the filter.

Example 9

The apparatus according to any of the preceding examples, wherein the driver comprises a current mirror which includes a current source, wherein strength of the current source is adjustable by the code.

Example 10

The apparatus according to any of the preceding examples, wherein the code is applied to the driver at boot-time, calibration time, during a time when a link is idle, or during an inter-packet gap.

Example 11

The apparatus according to any of the preceding examples, wherein the performance parameter is a voltage swing at an output of the driver.

Example 12

An apparatus comprising: a driver which is operable on two separate and different power supplies; a ring oscillator including at least three drivers, wherein an individual driver of the ring oscillator is a substantial replica of the driver, wherein the ring oscillator is to operate on a filtered version of one of the two separate and different power supplies; and circuitry to adjust a performance parameter of the driver according to an output of the ring oscillator.

Example 13

The apparatus of example 12, wherein the circuitry is to adjust the performance parameter of the driver at one or more of: boot-time, calibration time, during a time when a link is idle, or during an inter-packet gap.

Example 14

The apparatus according to any of the preceding examples 12 to 13, wherein the circuitry comprises: a comparator to compare an output of the ring oscillator with a reference clock; a filter coupled to the comparator, wherein the filter is to reduce noise in an output of the comparator; and a state machine coupled to an output of the filter, wherein the state machine is to generate a code which is to be received by the driver to adjust the performance parameter of the driver.

Example 15

The apparatus of example 14, wherein the filter comprises a shift-register chain.

Example 16

The apparatus of example 14, wherein the reference clock is generated by a crystal oscillator.

Example 17

The apparatus according to any of the preceding examples 12 to 16, wherein the driver is one of a USB, PCIe, or MIPI PHY compliant driver, and wherein the two power supplies include a power supply of 1 Volt and a power supply of 1.8 Volt.

Example 18

The apparatus according to any of the preceding examples 12 to 17, wherein the performance parameter is a voltage swing at an output of the driver.

Example 19

A system comprising: a memory; a processor coupled to the memory, the processor having a Universal Serial Bus (USB) compliant driver, which comprises a driver comprising a push-pull transmitter, wherein the processor includes: a first circuitry to sense variation in a power supply; and a second circuitry coupled to the first circuitry and to the driver, wherein the second circuitry is to generate a code according to an output of the first circuitry, wherein the code is provided to the driver to adjust a performance parameter of the driver; and a wireless interface to allow the processor to communicate with another device.

Example 20

The system of example 19, wherein the first circuitry comprises a ring oscillator including a delay stage, wherein the delay stage comprises devices of same size as those in the driver, and wherein the devices are connected to one another in a manner same as those in the driver.

Example 21

The system according to any of the preceding examples 19 to 20, wherein the processor comprises a low pass filter coupled to the power supply, wherein an output of the low pass filter is a filtered power supply which is provided to the ring oscillator as its power supply.

Example 22

The system according to any of the preceding examples 19 to 21, wherein the code is applied to the driver at one or more of: boot-time, calibration time, during a time when a link is idle, or during an inter-packet gap.

Example 23

A system comprising: a memory; a processor coupled to the memory, the processor including an apparatus according to any of examples 1 to 11; and a wireless interface to allow the processor to communicate with another device.

Example 24

A system comprising: a memory; a processor coupled to the memory, the processor including an apparatus according to any of examples 12 to 18; and a wireless interface to allow the processor to communicate with another device.

Example 25

An apparatus comprising: means for driving; means for sensing variation in a power supply; and means for generating a code according to an output of the means for sensing, wherein the code is provided to the means for driving to adjust a performance parameter of the means for driving.

Example 26

The apparatus of example 25, wherein the means for sensing comprises devices of same size as those in the means for driving, and wherein the devices are connected to one another in a manner same as those in the means for driving.

Example 27

The apparatus of example 26 comprises means for filtering the power supply.

Example 28

The apparatus according to any of the preceding examples 25 to 27, wherein the output of the means for sensing is a first clock, and wherein the means for generating comprises a digital comparator to compare the first clock with a second clock.

Example 29

A method comprising: sensing variation in a power supply; and generating a code according to an output of the sensing, wherein the code is provided to a driver to adjust a performance parameter of the driver.

Example 30

The method of example 29 comprises filtering the power supply.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:
1. An apparatus comprising:
a driver comprising a push-pull transmitter;
a first circuitry to sense variation in a power supply; and a second circuitry coupled to the first circuitry and to the driver, wherein the second circuitry is to generate a code according to an output of the first circuitry, wherein the code is provided to the driver to adjust a performance parameter of the driver.

2. The apparatus of claim 1, wherein the first circuitry comprises a ring oscillator including a delay stage, wherein the delay stage comprises devices of same size as those in the driver, and wherein the devices are connected to one another in a manner same as those in the driver.

3. The apparatus of claim 2 comprising a low pass filter coupled to the power supply, wherein an output of the low pass filter is a filtered power supply, which is to be provided to the ring oscillator as its power supply.

4. The apparatus of claim 1, wherein the output of the first circuitry is a first clock, and wherein the second circuitry comprises a digital comparator to compare the first clock with a second clock.

5. The apparatus of claim 4, wherein the second clock is generated by a crystal oscillator or an on-die clock.

6. The apparatus of claim 4, wherein the second circuitry comprises a filter coupled to an output of the comparator.

7. The apparatus of claim 6, wherein the filter comprises a shift-register chain.

8. The apparatus of claim 6, wherein the second circuitry comprises a finite state machine to generate the code according to an output of the filter.

9. The apparatus of claim 1, wherein the driver comprises a current mirror which includes a current source, and wherein strength of the current source is adjustable by the code.

10. The apparatus of claim 1, wherein the code is applied to the driver at boot-time, calibration time, during a time when a link is idle, or during an inter-packet gap.

11. The apparatus of claim 1, wherein the performance parameter is a voltage swing at an output of the driver.

12. An apparatus comprising:
a driver which is operable on two separate and different power supplies;
a ring oscillator including at least three drivers, wherein an individual driver of the ring oscillator is a substantial replica of the driver, wherein the ring oscillator is to operate on a filtered version of one of the two separate and different power supplies; and
circuitry to adjust a performance parameter of the driver according to an output of the ring oscillator.

13. The apparatus of claim 12, wherein the circuitry is to adjust the performance parameter of the driver at one or more of: boot-time, calibration time, during a time when a link is idle, or during an inter-packet gap.

14. The apparatus of claim 12, wherein the circuitry comprises:
a comparator to compare an output of the ring oscillator with a reference clock;
a filter coupled to the comparator, wherein the filter is to reduce noise in an output of the comparator; and
a state machine coupled to an output of the filter, wherein the state machine is to generate a code which is to be received by the driver to adjust the performance parameter of the driver.

15. The apparatus of claim 14, wherein the filter comprises a shift-register chain.

16. The apparatus of claim 14, wherein the reference clock is generated by a crystal oscillator.

17. The apparatus of claim 12, wherein the driver is one of a USB, PCIe, or MIPI PHY compliant driver, and wherein the two power supplies include a power supply of 1 Volt and a power supply of 1.8 Volt.

18. The apparatus of claim 12, wherein the performance parameter is a voltage swing at an output of the driver.

19. A system comprising:
a memory;
a processor coupled to the memory, the processor having a Universal Serial Bus (USB) compliant driver, which comprises a driver comprising a push-pull transmitter, wherein the processor includes:
a first circuitry to sense variation in a power supply; and
a second circuitry coupled to the first circuitry and to the driver, wherein the second circuitry is to generate a code according to an output of the first circuitry, wherein the code is provided to the driver to adjust a performance parameter of the driver; and
a wireless interface to allow the processor to communicate with another device.

20. The system of claim 19, wherein the first circuitry comprises a ring oscillator including a delay stage, wherein the delay stage comprises devices of same size as those in the driver, and wherein the devices are connected to one another in a manner same as those in the driver.

21. The system of claim 20, wherein the processor comprises a low pass filter coupled to the power supply, wherein an output of the low pass filter is a filtered power supply which is provided to the ring oscillator as its power supply.

22. The system of claim 19, wherein the code is applied to the driver at one or more of: boot-time, calibration time, during a time when a link is idle, or during an inter-packet gap.

* * * * *